US012537692B2

(12) United States Patent
Osborn et al.

(10) Patent No.: US 12,537,692 B2
(45) Date of Patent: Jan. 27, 2026

(54) SYSTEMS AND METHODS FOR COMPLETING A SELF-EXECUTING CRYPTOGRAPHIC INTERACTION PROTOCOL USING A COMPLETION DEVICE

(71) Applicant: Capital One Services, LLC, McLean, VA (US)

(72) Inventors: Kevin Osborn, Newton Highlands, MA (US); Austin Erickson, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 281 days.

(21) Appl. No.: 18/154,174

(22) Filed: Jan. 13, 2023

(65) Prior Publication Data

US 2024/0243920 A1 Jul. 18, 2024

(51) Int. Cl.
*H04L 9/32* (2006.01)
*H04L 67/12* (2022.01)

(52) U.S. Cl.
CPC ............ *H04L 9/3247* (2013.01); *H04L 9/321* (2013.01); *H04L 67/12* (2013.01)

(58) Field of Classification Search
CPC ......... H04L 9/3247; H04L 9/50; H04L 63/10; H04L 67/12; H04L 9/3239; H04L 9/3278; H04L 9/321

See application file for complete search history.

(56) References Cited

U.S. PATENT DOCUMENTS 11,195,154 B2   12/2021   Savolainen
11,790,363 B2*  10/2023   Kurian .................. H04L 9/3239
                                                      705/67

(Continued)

FOREIGN PATENT DOCUMENTS

JP         3223762 U        10/2019
KR      20200041607 A        4/2020
WO       2020107232 A1       6/2020

OTHER PUBLICATIONS

B. Xiao, X. Fan, S. Gao and W. Cai, "EdgeToll: A Blockchain-based Toll Collection System for Public Sharing of Heterogeneous Edges," IEEE INFOCOM 2019—IEEE Conference on Computer Communications Workshops (INFOCOM WKSHPS), Paris, France, 2019, pp. 1-6. (Year: 2019).*

(Continued)

*Primary Examiner* — Patrice L Winder
(74) *Attorney, Agent, or Firm* — Bookoff McAndrews, PLLC

(57) ABSTRACT

A computer-implemented method for completing self-executing cryptographic interaction protocols using a completion device is disclosed. The method comprises: establishing, by the completion device, a wireless connection with a source device; receiving, from the source device, a request for completion of a self-executing cryptographic interaction protocol; comparing the information that identifies the self-executing cryptographic interaction protocol or the source device to a configuration stored in the completion device; and based on the comparing resulting in a match: outputting, via an output component of the completion device, a first indication of the match between the information and the configuration; signing the self-executing cryptographic interaction protocol using a digital signature stored in a cryptographic hardware element of the completion device;

(Continued)

and sending the signed self-executing cryptographic interaction protocol to the source device.

20 Claims, 9 Drawing Sheets

(56) References Cited

U.S. PATENT DOCUMENTS

| | | |
|---|---|---|
| 2017/0053249 A1 | 2/2017 | Tunnell et al. |
| 2019/0362340 A1 | 11/2019 | Strong et al. |
| 2020/0013052 A1 | 1/2020 | Fok et al. |
| 2020/0213128 A1* | 7/2020 | Sharma ............... H04L 63/0823 |
| 2021/0049591 A1 | 2/2021 | Lamesh |
| 2021/0377045 A1* | 12/2021 | Doney .................. H04L 9/3247 |
| 2022/0158840 A1* | 5/2022 | Rowe .................... H04L 9/3247 |
| 2023/0224306 A1* | 7/2023 | Singh ...................... H04L 63/12 |
| | | 726/4 |
| 2023/0342779 A1* | 10/2023 | Upadhyay ............... G06F 21/32 |
| 2024/0013212 A1* | 1/2024 | Shamai ............. G06Q 20/3825 |
| 2024/0161090 A1* | 5/2024 | Fang .................... G06Q 20/381 |

OTHER PUBLICATIONS

"Hardware wallet," https://en.bitcoin.it/wiki/Hardware_wallet#:~:text=A%20hardwar%20wallet%20is%20a,of%20the%20device%20in%20plaintext.

* cited by examiner

SYSTEMS AND METHODS FOR COMPLETING A SELF-EXECUTING CRYPTOGRAPHIC INTERACTION PROTOCOL USING A COMPLETION DEVICE

TECHNICAL FIELD

Various embodiments of this disclosure relate generally to a completion device, and, more particularly, to systems and methods for completing a self-executing cryptographic interaction protocol using a completion device.

BACKGROUND

Generally, cryptographic interactions may be performed by limited forms or types of devices, such as a hard wallet or a soft wallet. A hard wallet may provide physical storage of private keys, tokens, or cryptocurrency, while soft wallets may provide software storage of private keys, tokens, or cryptocurrency. While hard wallets may have heightened security in that they are typically air gapped, a user's cryptographic data risks being lost if the hard wallet is lost or damaged. Further, a soft wallet may have a heightened risk of hacking due to the device's connection to the internet, cloud servers, etc.

Conventional techniques, including the foregoing, fail to account for users' need to access cryptographic funds securely and under various conditions. As cryptocurrency increases in popularity and use, users may need to be able to access the funds, e.g., at a train station, with minimal the risk that a hacker may access their private keys, tokens, or cryptocurrency. Without an effective way to facilitate secure and convenient cryptographic interactions across locales, these interactions may remain inaccessible and/or hackable.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for completing a self-executing cryptographic interaction protocol, e.g., using a completion device.

In one aspect, a computer-implemented method for completing self-executing cryptographic interaction protocols using a completion device may include establishing, by the completion device, a wireless connection with a source device; receiving, from the source device, a request for completion of a self-executing cryptographic interaction protocol, wherein the request includes an amount associated with the self-executing cryptographic interaction protocol and information that identifies the self-executing cryptographic interaction protocol or the source device; comparing the information that identifies the self-executing cryptographic interaction protocol or the source device to a configuration stored in the completion device, wherein the configuration identifies one or more self-executing cryptographic interaction protocols that the completion device is permitted to complete; and based on the comparing resulting in a match: outputting, via an output component of the completion device, a first indication of the match between the information and the configuration; signing the self-executing cryptographic interaction protocol using a digital signature stored in a cryptographic hardware element of the completion device; and sending the signed self-executing cryptographic interaction protocol to the source device.

In another aspect, the completion device may include at least one memory storing instructions and at least one processor that may execute the instructions to perform operations for completing self-executing cryptographic interaction protocols using the completion device. The operations may include establishing a connection with a source device; receiving, from the source device, a request for completion of a self-executing cryptographic interaction protocol, wherein the request includes information that identifies the self-executing cryptographic interaction protocol or the source device; comparing the information that identifies the self-executing cryptographic interaction protocol or the source device to a configuration, wherein the configuration identifies one or more self-executing cryptographic interaction protocols that the completion device is permitted to complete; and based on the comparing resulting in a match: outputting, via an output component of the completion device, a first indication of the match between the information and the configuration; and sending a signed self-executing cryptographic interaction protocol for an amount to the source device.

In another aspect, a non-transitory computer-readable medium storing instructions that, when executed by a processor, cause the processor to perform a method for completing self-executing cryptographic interaction protocols using a completion device. The method may include establishing a wireless connection with a source device; receiving, from the source device, a request for completion of a self-executing cryptographic interaction protocol, wherein the request includes an amount associated with the self-executing cryptographic interaction protocol and information that identifies the self-executing cryptographic interaction protocol or the source device; comparing the information that identifies the self-executing cryptographic interaction protocol to a configuration stored in the completion device, wherein the configuration identifies one or more self-executing cryptographic interaction protocols that the completion device is permitted to complete; and based on the comparing resulting in a match: outputting, via an output component of the completion device, a first indication of the match between the information and the configuration; receiving input of a second indication to sign the self-executing cryptographic interaction protocol using a digital signature stored in a cryptographic hardware element of the completion device; signing the self-executing cryptographic interaction protocol using the digital signature; and sending the signed self-executing cryptographic interaction protocol to the source device.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
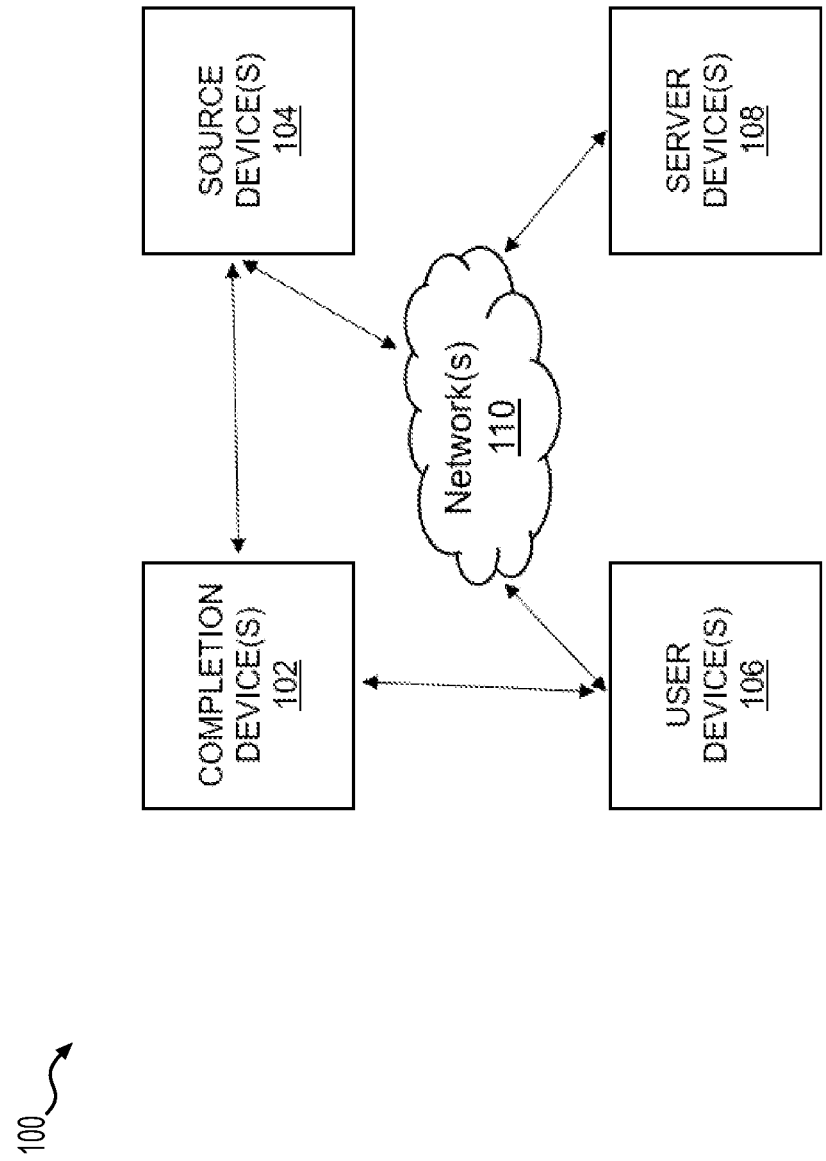
FIG. 1 depicts an exemplary environment for completing a self-executing cryptographic interaction protocol, according to one or more embodiments.

According to certain aspects of the disclosure, methods and systems are disclosed for completing a self-executing cryptographic interaction protocol, e.g., using a completion device. However, conventional techniques may not be suitable. For example, conventional techniques may not be capable of preparing and executing a self-executing cryptographic interaction protocol. Accordingly, improvements in technology relating to completion devices are needed.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "customer" generally encompasses any person or entity that may desire information, resolution of an issue, purchase of a product, or engage in any other type of interaction with a provider. The term "browser extension" may be used interchangeably with other terms like "program," "electronic application," or the like, and generally encompasses software that is configured to interact with, modify, override, supplement, or operate in conjunction with other software.

FIG. 1 depicts an exemplary environment 100 for completing a self-executing cryptographic interaction (e.g., transaction) protocol, according to one or more embodiments. The environment 100 may include one or more completion devices 102, one or more source devices 104, one or more user devices 106, one or more server devices 108, and a network 110. Although FIG. 1 depicts a single completion device 102, source device 104, user device 106, server device 108, and network 110, the embodiments described herein are applicable to environments 100 that include two or more completion devices 102, source devices 104, user devices 106, server devices 108, and/or networks 110 in any suitable arrangement.

The completion device 102 may include a cryptographic wallet or other similar hardware device capable of receiving a request for completion of a self-executing cryptographic interaction protocol and completing the self-executing cryptographic interaction protocol. As described elsewhere herein, the completion device 102 may include one or more processors, memories, wireless interfaces, cryptographic hardware elements, and/or self-executing cryptographic interaction protocol configurations.

The source device 104 may include any device capable of generating a request for completion of a self-executing cryptographic interaction protocol. For example, the source device 104 may include an interaction terminal, a turnstile, a vending machine, an entry/exit gate or door, and/or the like. In other words, the source device 104 may include any device with which a user may wish to transact for purchase or sale of an item or service. The source device 104 may include one or more processors, memories, displays, and/or the like.

The user device may be a mobile device, such as a smartphone, a cell phone, a tablet, a laptop computer, etc., a desktop computer, and/or the like. The user device 106 may communicate with the completion device 102 to determine that the completion device 102 has received and/or completed a self-executing cryptographic interaction protocol. Additionally, or alternatively, the user device 106 may communicate with a server device 108 to update an account balance associated with a user of the completion device 102 and/or user device 106 based on the completion device completing a self-executing cryptographic interaction protocol.

The server device 108 may be a computer, system of computers (e.g., rack server(s)), or a cloud service computer system (e.g., in a data center). The server device 108 may host a portion or copy of a blockchain ledger and may communicate with the source device 104 to record that a self-executing cryptographic interaction protocol from the source device 104 has been completed by the completion device 102. Additionally, or alternatively, the server device 108 may communicate with the user device 106 to update an application installed on the user device 106 with information indicating that the self-executing cryptographic interaction protocol has been completed by the completion device 102.

The network 110 may include one or more wired and/or wireless networks, such as the Internet, an intranet, a wide area network ("WAN"), a local area network ("LAN"), a personal area network ("PAN"), a cellular network (e.g., a 3G network, a 4G network, a 5G network, etc.) or the like. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "webpage" generally encompasses a location, data store, or the like that is, e.g., hosted and/or operated by a computer system so as to be accessible online, and that may include data configured to cause a program such as a web browser to perform operations such as send, receive, or process data, generate a visual display and/or an interactive interface, or the like. The user device 106 and the server device 108 may be connected via the network 110, using one or more standard communication protocols. The user device 106 and the server device 108 may transmit and receive messages from each other across the network 110, as discussed in more detail below.

Although depicted as separate components in FIG. 1, it should be understood that a component or portion of a component in the exemplary environment 100 may in some embodiments, be integrated with or incorporated into one or more other components. For example, the server device 108 may be integrated in a data storage system. In some embodiments, operations or aspects of one or more of the components discussed above may be distributed amongst one or more other components. Any suitable arrangement and/or integration of the various systems and devices of the exemplary environment 100 may be used.

Further aspects of completing a self-executing cryptographic interaction protocol are discussed in further detail below. In the following disclosure, various acts may be described as performed or executed by a component from FIG. 1, such as the completion device 102, the source device 104, the user device 106, the server device 108, or components thereof. However, it should be understood that in various embodiments, various components of the exemplary environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

The example environment 100 described above is provided merely as an example, and may include additional, fewer, different, or differently arranged aspects than depicted in FIG. 1.

Figure 2:
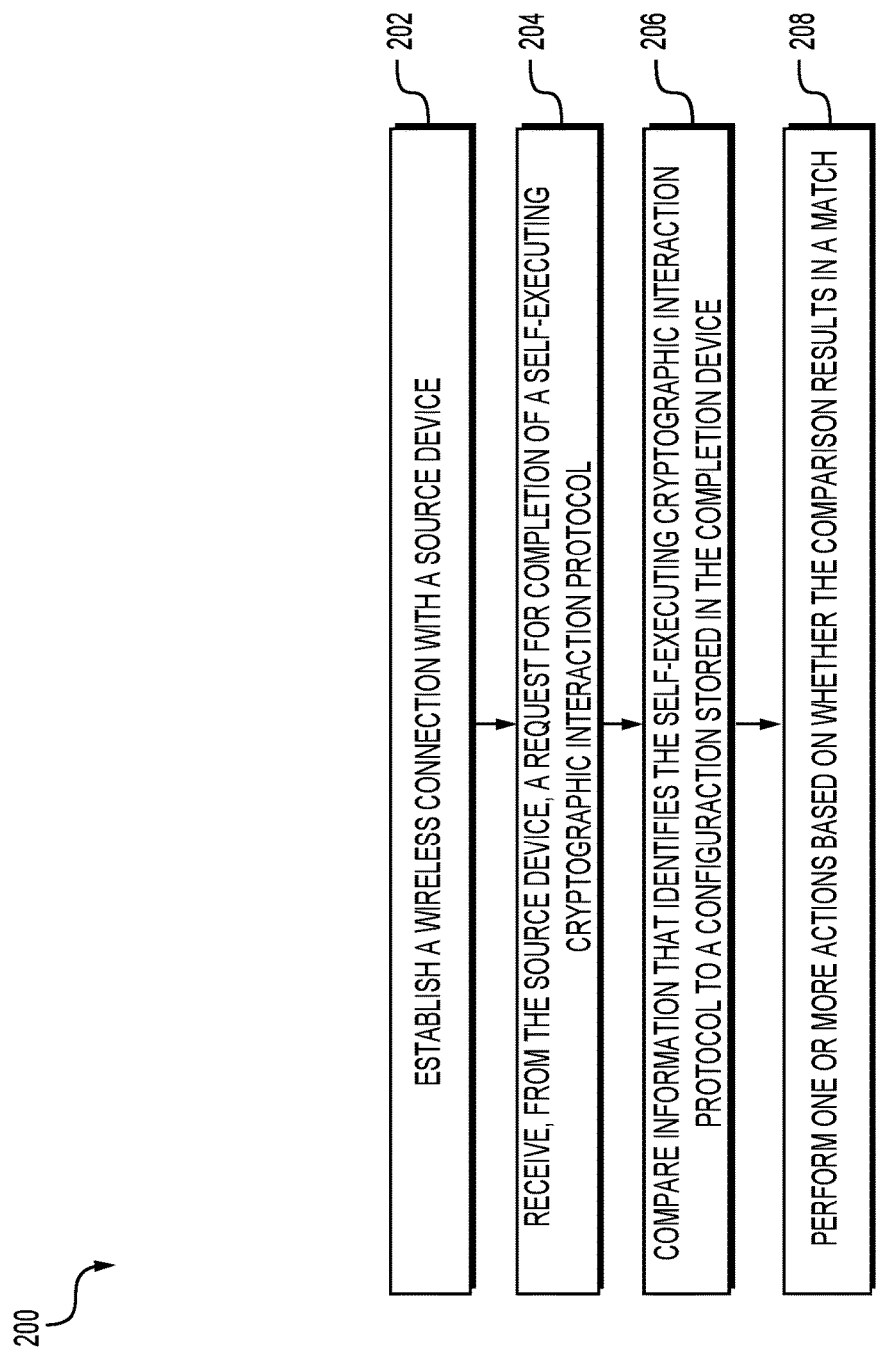
FIG. 2 depicts a flowchart of an exemplary method of completing a self-executing cryptographic interaction protocol using a completion device, according to one or more embodiments.

FIG. 2 depicts a flowchart of an exemplary method 200 of completing a self-executing cryptographic interaction protocol using a completion device, according to one or more embodiments. In some embodiments, the method 200 may be performed by a completion device 102.

At step 202, the method 200 may include establishing a wireless connection with a source device 104. The completion device 102 may establish the wireless connection with the source device 104 when the completion device 102 is moved within communicative proximity of the source device 104 (or an antenna of the source device 104). In some embodiments, when the completion device 102 is moved within communicative proximity of the source device 104, the completion device 102 may output a request for a user of the completion device 102 to approve establishment of the wireless connection and the completion device 102 may establish the connection based on receiving input from the user to establish the wireless connection.

The wireless connection may include a short-range wireless connection. For example, the wireless connection may include a Bluetooth connection, a near-field communication (NFC) connection, and/or the like. This may reduce or eliminate inadvertent establishment of a wireless connection to a source device 104.

The completion device 102 may receive the configuration from a user device 106 to which the completion device is connected. For example, the completion device 102 may be connected, via a wireless connection, to the user device 106 and the user of the user device 106 may prepare the configuration and/or cause the user device 106 to provide the configuration to the completion device 102. Continuing with the previous example, the user may input addresses, types of source devices 104, and/or the like to prepare the configuration and the user device 106 may provide the configuration to the completion device 102 for storage in the completion device 102.

The method 200 may include, at step 204, receiving, from the source device 104, a request for completion of a self-executing cryptographic interaction protocol. For example, the completion device 102 may receive a request for completion of a self-executing cryptographic interaction protocol. The completion device 102 may receive the request after establishing the wireless connection, based on requesting the self-executing cryptographic interaction protocol from the source device 104, based on an individual providing input to the source device 104 to generate the request for the self-executing cryptographic interaction protocol, and/or the like. The completion device 102 may receive the request via the established wireless connection.

A self-executing cryptographic interaction protocol may include a digital contract, code, and/or the like for completion of an interaction. For example, the self-executing cryptographic interaction protocol may include a smart contract. As specific examples, the self-executing cryptographic interaction protocol may include an Ethereum Request for Comments (ERC) 20 (ERC20) contract or an ERC721 contract. Other examples of self-executing cryptographic interaction protocols may include Cardano, Solana, Avalanche, EOS.IO, or any other suitable self-executing cryptographic interaction protocol. The self-executing cryptographic interaction protocol may identify an address of the source device 106, an amount of an interaction associated with the self-executing cryptographic interaction protocol, an item or service associated with the interaction, and/or the like. The request may include the self-executing cryptographic interaction protocol, information to confirm an identity of the source device 104, and/or the like.

At step 206, the method 200 may include comparing information that identifies the self-executing cryptographic interaction protocol to a configuration stored in the completion device. For example, the completion device 102 may compare information that identifies the self-executing cryptographic interaction protocol to a configuration stored in the completion device 102. The completion device 102 may compare the information to the configuration based on receiving the request, based on a user of the completion device 102 providing input to perform the comparison, and/or the like.

The configuration may include information that identifies a set of self-executing cryptographic interaction protocols which the completion device 102 is pre-configured for completing. For example, the configuration may include addresses of source devices 104 for which the completion device 102 is permitted to complete a received self-executing cryptographic interaction protocol, may include a maximum amount for a self-executing cryptographic interaction protocol for which the completion device 102 is allowed to complete, may include items and/or services for which the completion device 102 is allowed to complete a self-executing cryptographic interaction protocol, types of source devices 104, and/or the like. In some embodiments, the configuration may include a JavaScript Object Notation (JSON) file.

The completion device 102 may compare the information to the configuration by determining whether information associated with the self-executing cryptographic interaction protocol matches information associated with the configuration. For example, the completion device 102 may compare an address of the source device 104 included in the self-executing cryptographic interaction protocol to a list of approved address included in the configuration. The completion device 102 may determine whether the comparison results in a match. For example, the completion device 102 may determine whether the address for the source address in the self-executing cryptographic interaction protocol matches an address in the list of address in the configuration. While these examples, list matches that may be exact or nearly exact, it should be noted that an exact match may not be required.

In some embodiments, the completion device 102 may receive the configuration at various stages of method 200, e.g., prior to establishing the internet connection. For example, the completion device 102 may receive the configuration prior to completing steps 202 to 208. In another example, the completion device 102 may receive the configuration after establishing the wireless connection at 202. In any case, the configuration may be stored, e.g., in completion device 102.

The method 200 may include, at step 208, performing one or more actions based on whether the comparison results in a match. For example, the completion device 102 may perform one or more actions based on whether the comparison results in a match. The completion device 102 may perform the one or more actions after comparing the information and the configuration, after determining that there is a match or is not a match between the information and the configuration, based on input from a user of the completion device 102, and/or the like.

If the comparison at step 206 results in a match, the completion device 102 may perform one or more actions to complete the self-executing cryptographic interaction protocol. In the case of the match, the completion device 102 may output, via an output component of the completion device 102, a first indication of the match between the information and the configuration. For example, the first indication may include a light, a color emitted from the light (e.g., a green color may indicate success and a red color may indicate failure), a sound from a speaker, and/or the like and may indicate that the completion device 102 has received a request that matches the configuration. The first indication may also notify the user to provide input to complete the self-executing cryptographic interaction protocol. For example, based on output of the first indication, the user may provide input to the completion device 102 via an input component of the completion device 102. The input by the user may include a press of a button, a biometric scan by a biometric scanner, a voice command provided to a microphone, an alphanumeric code typed into a keypad or user interface, and/or the like.

Based on receiving the input from the user to complete the self-executing cryptographic interaction protocol, the completion device 102 may sign the self-executing cryptographic interaction protocol. For example, the completion device 102 may sign the self-executing cryptographic interaction protocol using a digital signature stored in a cryptographic hardware element of the completion device 102. The completion device 102 may then send the signed self-executing cryptographic interaction protocol to the source device 104 via the wireless connection. The completion device 102 may output a second indication via the output component (or another output component of the completion device 102) to indicate that the signed self-executing cryptographic interaction protocol has been provided to the source device 104, that the interaction has been completed, and/or the like.

Based on receiving the signed self-executing cryptographic interaction protocol, the source device 104 may communicate with a server device 108 to record the interaction on a blockchain, to withdraw an amount from an account associated with the user of the completion device 102, and/or the like. The source device 104 may provide, to the completion device 102, an indication that the self-executing cryptographic interaction protocol has been completed.

The completion device 102 may communicate with a user device 106 connected to the completion device 102. For example, the completion device 102 and the user device 106 may be connected to each other via another wireless connection (e.g., another short-range wireless connection) and the completion device 102 may provide an indication to the user device 106 that the self-executing cryptographic interaction protocol has been completed. The user device 106 may then update an account balance associated with the user of the user device 106 and/or may communicate with a server device 108 to update the account balance. Similarly, the completion device 102 may update an internally stored account balance associated with the user of the completion device 102.

If the comparison does not result in a match, the completion device 102 may deny the request for completion of the self-executing cryptographic interaction protocol. For example, the completion device 102 may provide a message to the source device 104 indicating that the request is being denied. The completion device 102 may disconnect the wireless connection based on the comparison not resulting in the match. For example, the completion device 102 may disconnect the wireless connection after denying the request. The completion device 102 may output an indication, via an output component, that the request has been denied and/or may provide an indication to the user device 106 for display that indicates that the request has been denied.

The example method 200 is provided merely as an example, and may include additional, fewer, different, or differently arranged aspects than depicted in FIG. 2.

Figure 3A:
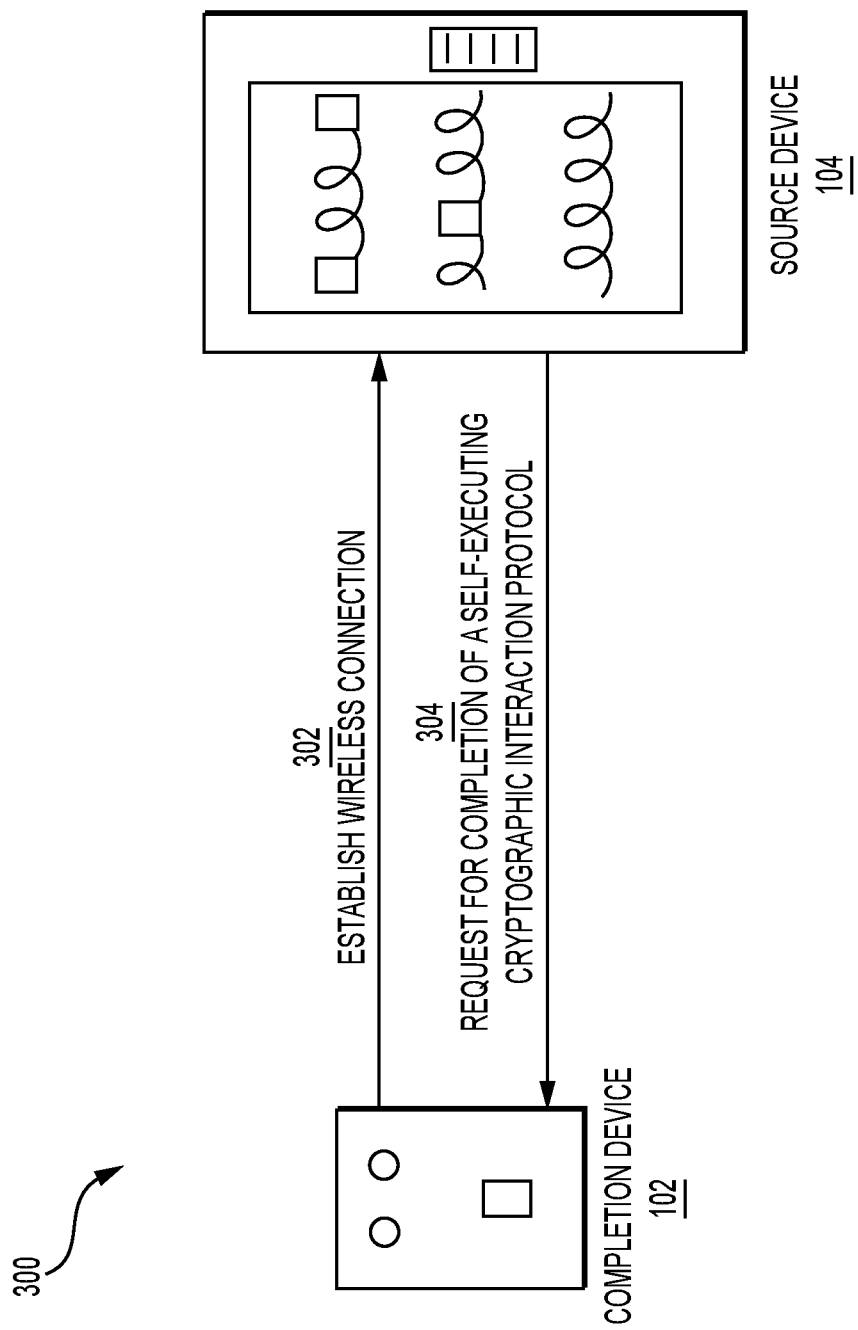
FIGS. 3A-3D depict an example of completing a self-executing cryptographic interaction protocol using a completion device.

FIGS. 3A-3D depict an example 300 of completing a self-executing cryptographic interaction protocol using a completion device. As illustrated in FIG. 3A, the example 300 may include a completion device 102 and a source device 104 (e.g., the source device 104 in the example 300 may include a vending machine). As illustrated at 302, the completion device 102 may establish a wireless connection. For example, the completion device 102 may establish the wireless connection with the source device 104, e.g., in a manner similar to that described above at 202 of FIG. 2. As illustrated at 304, the source device 104 may provide, to the completion device 102, a request for completion of a self-executing cryptographic interaction protocol. For example, the source device 104 may provide the request in a manner similar to that described above at step 204 of FIG. 2. In some examples, the request of step 304 may be sent following user selection of one or more options of source device 104. For example, upon user selection of a button or other input mechanism of source device 104 indicative of a selection of a first item (e.g., a pack of gum), the request of step 304 may be sent to completion device 102, requesting sufficient funds to cover the cost of the first item.

Figure 3B:
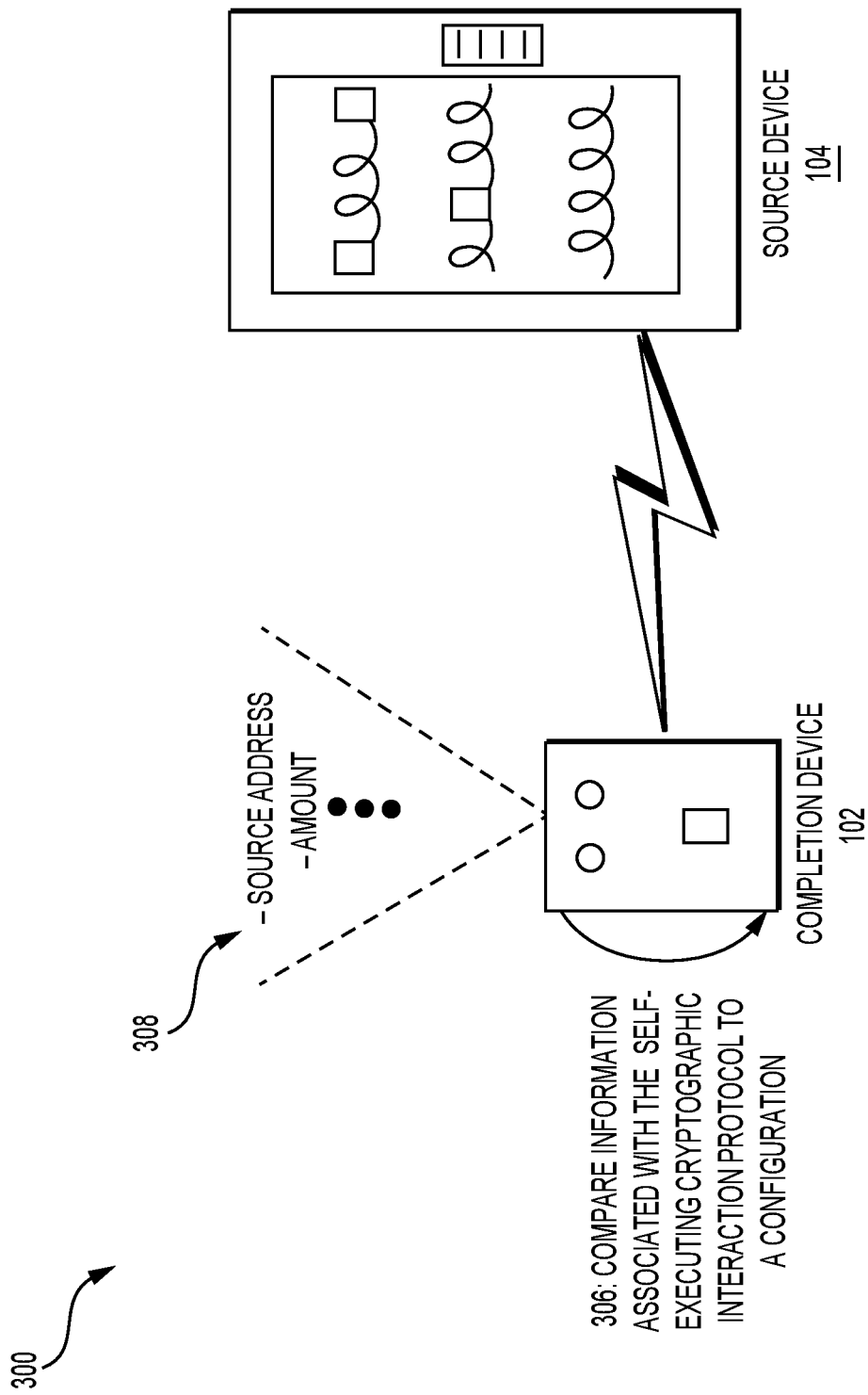

Turning to FIG. 3B, the completion device 102 may at 306, compare information associated with the self-executing cryptographic interaction protocol to a configuration stored by the completion device 102. For example, the completion device 102 may perform the comparison in a manner similar to that described above at 206 of FIG. 2. The configuration may include, at 308, e.g., a source address of the request, an amount associated with the self-executing cryptographic interaction protocol, and/or the like.

Figure 3C:
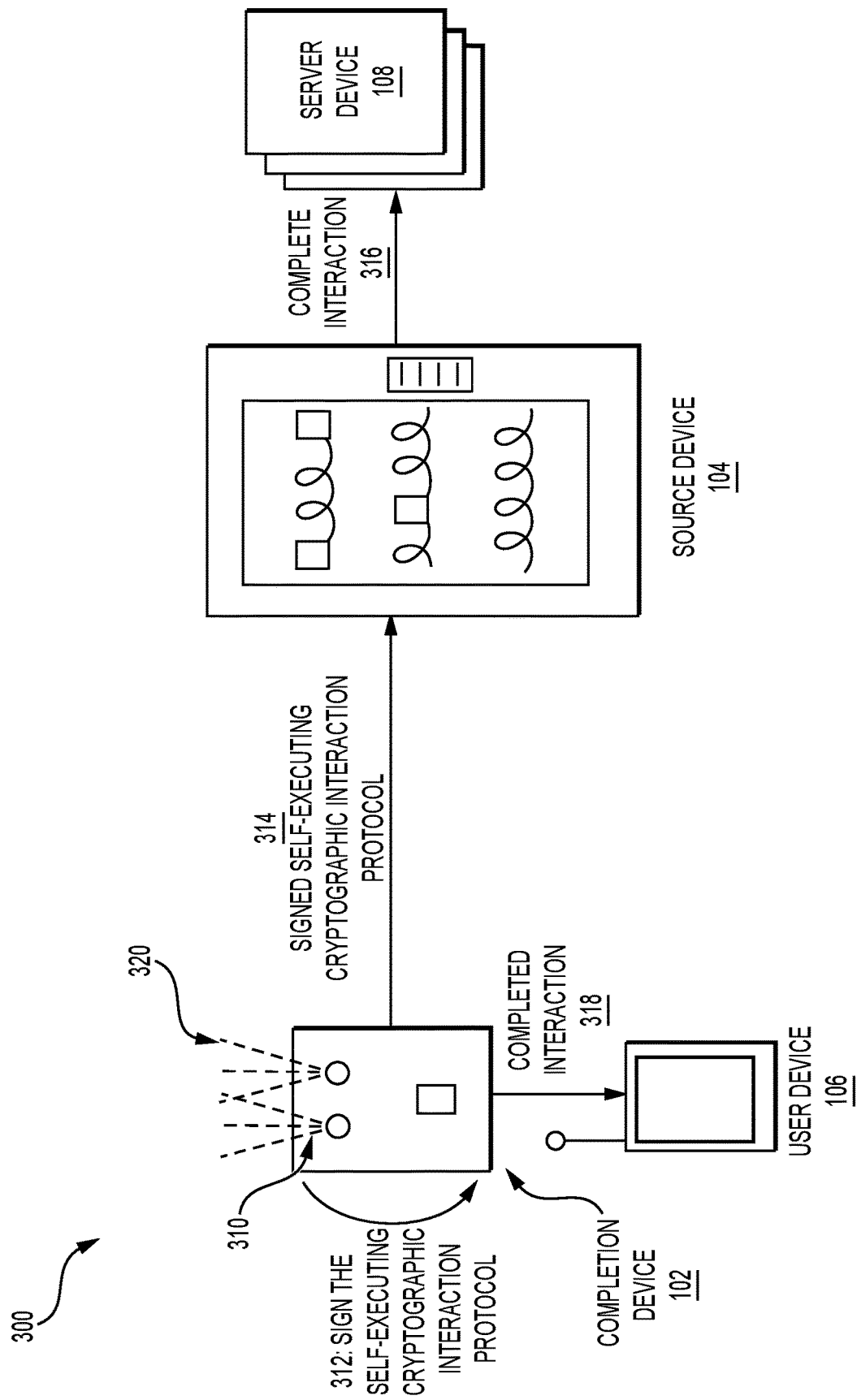

FIG. 3C illustrates examples of actions that the completion device 102 may perform if the comparison results in a match. The operations illustrated in FIG. 3C may be similar to that described above at step 208 of FIG. 2. As illustrated at 310, the completion device 102 may output a first indication that the comparison has resulted in a match (e.g., by activating a light of the completion device 102). For example, the completion device 102 may output the first indication. As illustrated at 312, the completion device 102 may sign the self-executing cryptographic interaction protocol. For example, the completion device 102 may sign the self-executing cryptographic interaction protocol using a digital signature stored in a cryptographic element of the completion device 102.

As illustrated at 314, the completion device 102 may send the signed self-executing cryptographic interaction protocol to the source device 104. As illustrated at 316, the source device 104 may communicate with one or more server devices 108 to complete the interaction. As illustrated at 318, the completion device 102 may provide an indication to the user device 106 that the interaction has been completed. Additionally, or alternatively, the completion device 102 may output an indication that the interaction has been completed, as illustrated at 320.

Figure 3D:
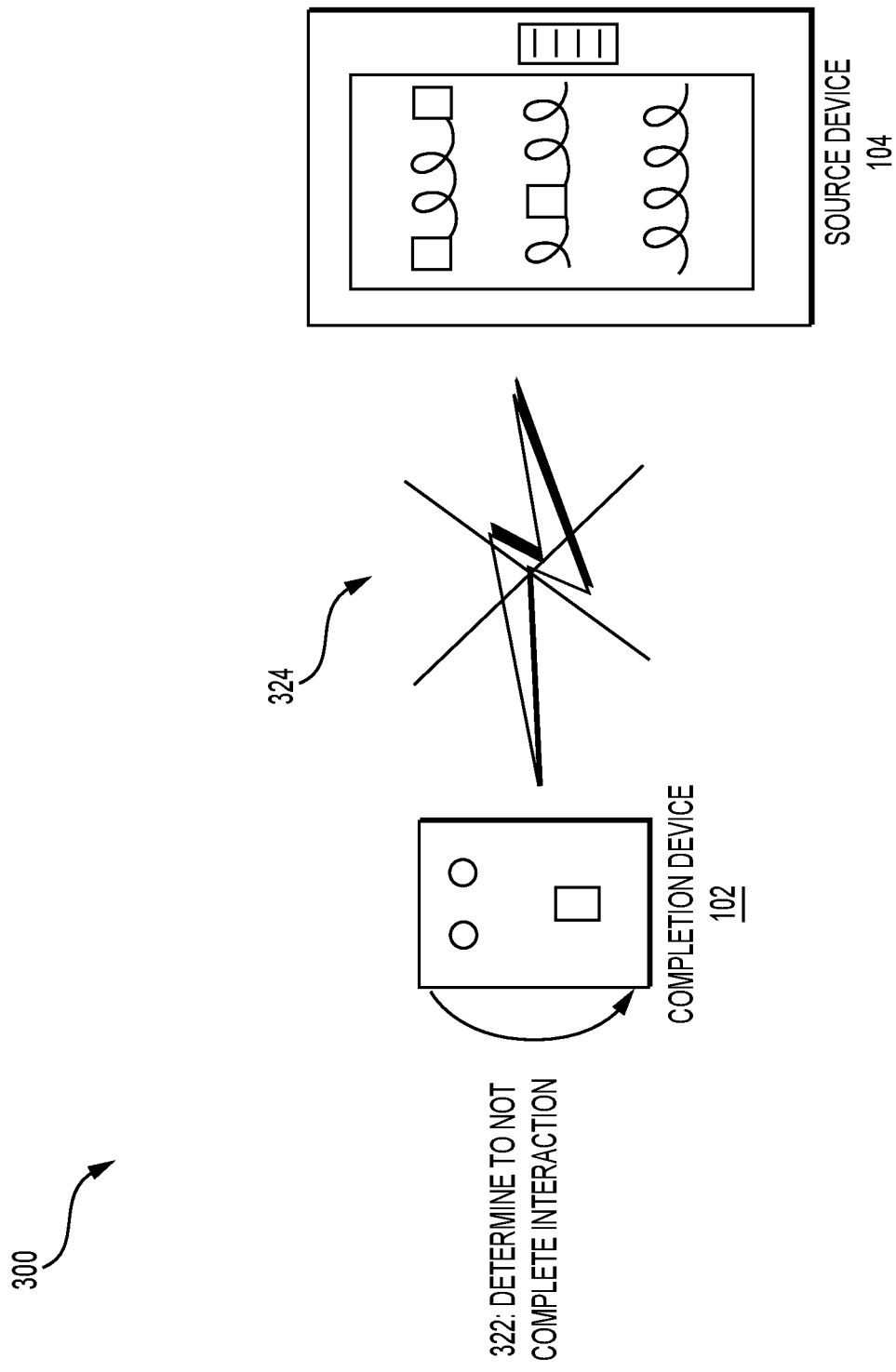

FIG. 3D illustrates examples of actions that the completion device 102 may perform if the comparison does not result in a match. The operations illustrated in FIG. 3D may be similar to that described above at step 208 of FIG. 2. As illustrated at 322, the completion device 102 may determine to not complete the interaction associated with the self-executing cryptographic interaction protocol, e.g., in response to an indication that the comparison has not resulted in a match. As illustrated at 324, the completion device 102 may disconnect the wireless connection to the source device 104 based on determining to not complete the interaction. Optionally, based on a determination to not complete the interaction associated with the self-executing cryptographic interaction protocol, completion device 102 may output, via an output component of the completion device 102, a decline indication. For example, the decline indication may include a light, a color emitted from the light, a sound from a speaker, and/or the like and may indicate that the completion device 102 has declined a request.

The example 300 described above is provided merely as an example, and may include additional, fewer, different, or differently arranged aspects than depicted in FIGS. 3A-3D.

Figure 4A:
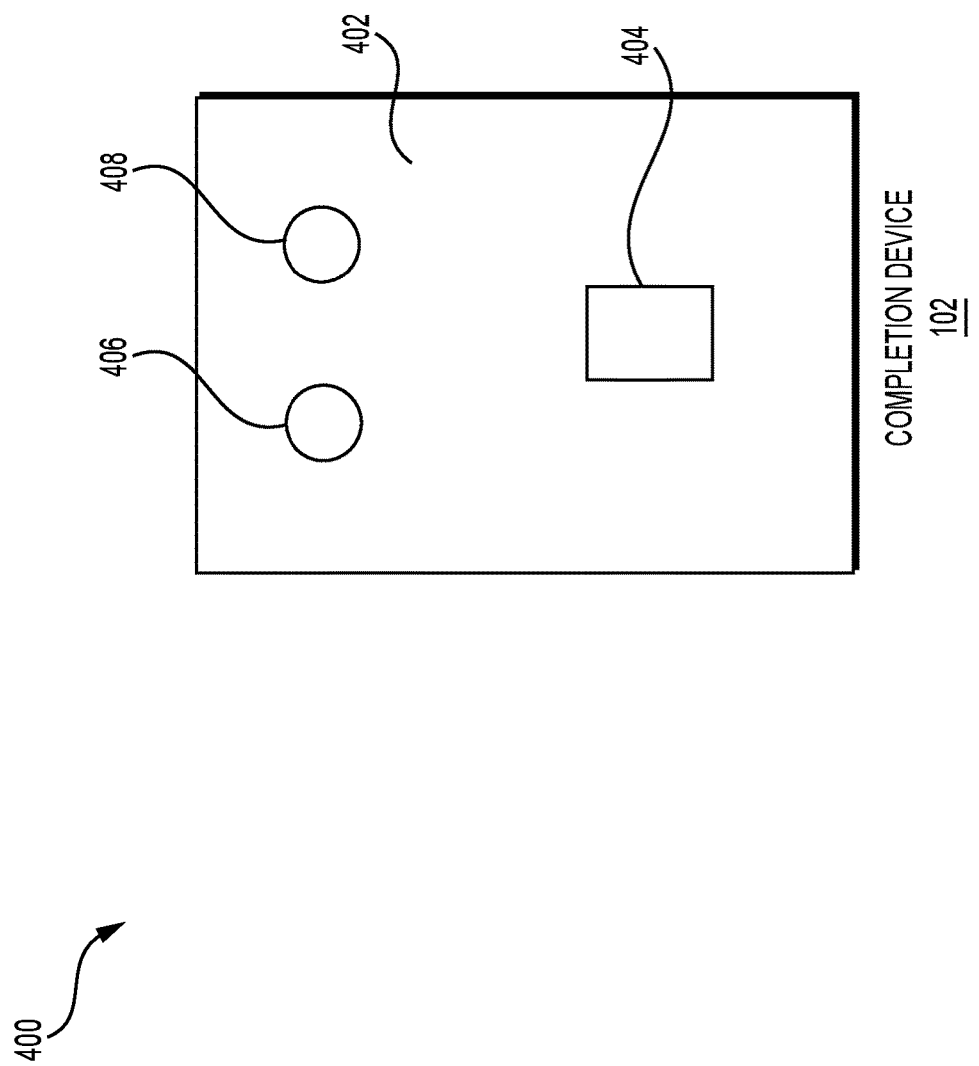
FIG. 4A depicts exemplary external components of a completion device, according to one or more embodiments.
Figure 4B:
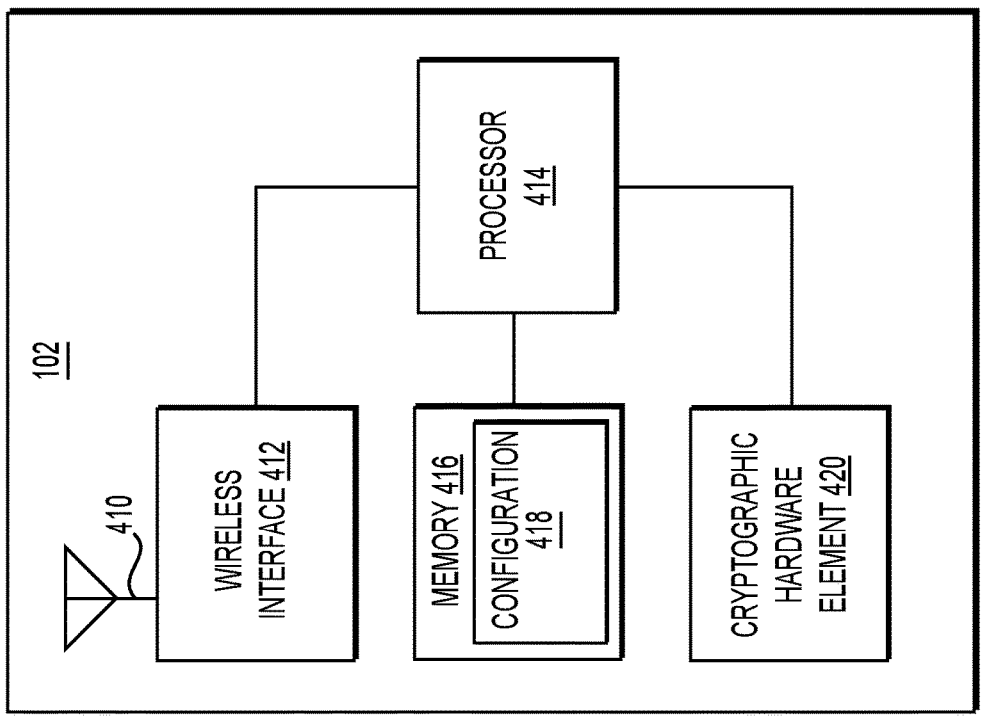
FIG. 4B depicts exemplary internal components of a completion device, according to one or more embodiments.

FIGS. 4A and 4B depict an example 400 of a completion device, according to one or more embodiments. FIG. 4A illustrates example external components of a completion device 102. As illustrated, the completion device 102 may include a body 402. The body 402 may be formed in any shape, such as a rectangular box, a circular disk or puck shape, hexagonal disk or puck shape, and/or the like. The body 402 may comprise plastic, metal, carbon fiber, and/or the like. The completion device 102 may further include an input component 404. The input component 404 may include a button, a keyboard, a screen that can display a digital keyboard, a biometric scanner (e.g., a fingerprint scanner), and/or the like. The completion device 102 may further include output components 406, 408. The output components may include a light, a speaker, a screen, and/or the like.

FIG. 4B illustrates example internal components of the completion device 102. The completion device 102 may include an antenna 410, which the completion device 102 may use to send and/or receive wireless signals via a wireless connection. The completion device 102 may include a wireless interface 412, which may be associated with one or more communication protocols, such as Bluetooth, NFC, and/or the like. The wireless interface 412 may control establishment and/or disconnection of a wireless connection according to the one or more communication protocols. The completion device 102 may further include a processor 414, which may execute a set of instructions to control operations of the completion device 102. The completion device 102 may further include memory 416, which may store the instructions that the processor 414 executes. Additionally, or alternatively, the memory 416 may store a configuration 418 (e.g., a configuration for a set of self-executing cryptographic interaction protocols). The completion device 102 may further include a cryptographic hardware element 420. The cryptographic hardware element 420 may include circuitry that stores that stores a digital signature in an encrypted form.

The example 400 described above is provided merely as an example, and may include additional, fewer, different, or differently arranged aspects than depicted in FIGS. 4A and 4B.

In this way, certain embodiments may enable completion of a self-executing cryptographic interaction protocol using a completion device to provide a secure and convenient way to use cryptocurrency without some of the physical or security limitations inherent to hard wallets and soft wallets. Certain embodiments may be user specific, e.g., only certain interactions pre-authorized by a user are approved for completion. This may increase security by adding an additional requirement to the completion process. For example, a user may pre-approve completion of a self-executing cryptographic interaction for a bus line the user rides daily. The completion device would be primed to recognize the server address, which would reduce completion time, while acceptance of the interaction would still be limited by, for example, the user's biometrics as an input at completion device 102. Thus, while completion device 102 may be misplaced or stolen, an unintended user may not be able to complete interactions due to the multiple layers of protection.

Figure 5:
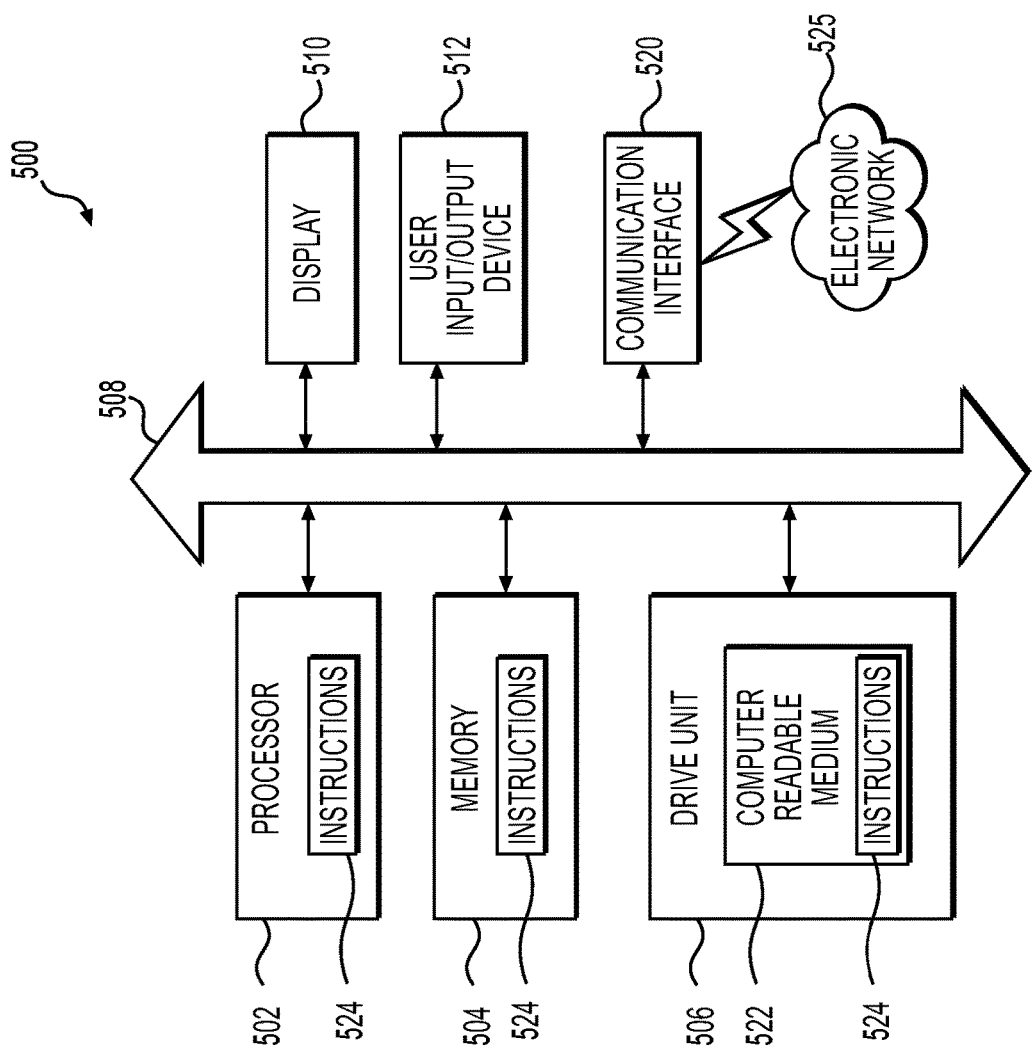
FIG. 5 depicts an example of a computing device, according to one or more embodiments.

FIG. 5 depicts an example of a computer 500, according to certain embodiments. FIG. 5 is a simplified functional block diagram of a computer 500 that may be configured as a device for executing processes or operations depicted in, or described with respect to, FIGS. 1-4B, according to exemplary embodiments of the present disclosure. For example, the computer 500 may be configured as the completion device 102, source device 104, user device 106, server device 108, and/or another device according to exemplary embodiments of this disclosure. In various embodiments, any of the systems herein may be a computer 500 including, e.g., a data communication interface 520 for packet data communication. The computer 500 may communicate with one or more other computers 500 using the electronic network 525. Wireless and/or network interfaces described herein may include one or more communication interfaces 520. The electronic network 525 may include a wired or wireless network similar to the network 110 depicted in FIG. 1.

The computer 500 also may include a central processing unit (CPU), in the form of one or more processors 502, for executing program instructions 524. A processor described herein may include one or more processors 502. The computer 500 may include an internal communication bus 508, and a drive unit 506 (such as read-only memory (ROM), hard disk drive (HDD), solid-state disk drive (SDD), etc.) that may store data on a computer readable medium 522, although the computer 500 may receive programming and data via network communications. The computer 500 may also have a memory 504 (such as random access memory (RAM)) storing instructions 524 for executing techniques presented herein, although the instructions 524 may be stored temporarily or permanently within other modules of the computer 500 (e.g., processor 502 and/or computer readable medium 522). A memory described herein may include one or more memories 504. The computer 500 also may include user input and output ports 512 and/or a display 510 to connect with input and output devices such as keyboards, mice, touchscreens, monitors, displays, etc. The display may include one or more displays 510. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another, e.g., from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to completing a self-executing cryptographic interaction protocol, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features. For example, while some of the embodiments above pertain to completing a self-executing cryptographic interaction protocol, any suitable activity may be used. In an exemplary embodiment, instead of or in addition to completing a self-executing cryptographic interaction protocol, certain embodiments include competing other types of interactions.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for completing self-executing cryptographic interaction protocols using a completion device, comprising:
    establishing, by the completion device, a wireless connection with a source device;
    receiving, from the source device, a request for completion of a self-executing cryptographic interaction protocol, wherein the request includes an amount associated with the self-executing cryptographic interaction protocol and information that identifies the self-executing cryptographic interaction protocol or the source device;
    receiving, by the completion device, an input by a user to perform a comparison of information;
    comparing the information that identifies the self-executing cryptographic interaction protocol or the source device to a configuration stored in the completion device, wherein the configuration identifies one or more self-executing cryptographic interaction protocols that the completion device is permitted to complete; and
    based on the comparing resulting in a match:
        outputting, via an output component of the completion device, a first indication of the match between the information and the configuration;
        signing the self-executing cryptographic interaction protocol using a digital signature stored in a cryptographic hardware element of the completion device; and
        sending the signed self-executing cryptographic interaction protocol to the source device.

2. The computer-implemented method of claim 1, wherein the comparing of the information and the configuration further comprises:
    comparing an address of the source device to one or more addresses included in the configuration; and
    determining that the comparing results in the match based on comparing the address to the one or more addresses.

3. The computer-implemented method of claim 1, further comprising:
    receiving, prior to establishing the wireless connection, the configuration from a user device to which the completion device is connected.

4. The computer-implemented method of claim 1, wherein the first indication comprises at least one of:
    a light of the completion device,
    a color emitted from the light of the completion device, or
    a sound emitted from a speaker of the completion device.

5. The computer-implemented method of claim 1, wherein the wireless connection comprises a short-range wireless connection.

6. The computer-implemented method of claim 1, further comprising:
    receiving, after outputting the first indication, input of a second indication to sign the self-executing cryptographic interaction protocol using the digital signature.

7. The computer-implemented method of claim 6, wherein the input comprises at least one of:
    a press of a button,
    a biometric scan,
    a voice command, or
    an alphanumeric code.

8. The computer-implemented method of claim 1, further comprising:
    receiving, from the source device, a second indication that the self-executing cryptographic interaction protocol has been completed; and
    outputting a third indication that the self-executing cryptographic interaction protocol has been completed.

9. The computer-implemented method of claim 1, wherein the completion device is connected to a user device associated with a same user as the completion device.

10. The computer-implemented method of claim 9, further comprising:
    sending a message to the user device to update a digital balance of the same user based on completion of the self-executing cryptographic interaction protocol.

11. A completion device, comprising:
    at least one memory storing instructions; and
    at least one processor executing the instructions to perform operations for completing self-executing cryptographic interaction protocols using the completion device, the operations including:
    establishing a connection with a source device;
    receiving, from the source device, a request for completion of a self-executing cryptographic interaction protocol, wherein the request includes information that identifies the self-executing cryptographic interaction protocol or the source device;
    receiving, by the completion device, an input by a user to perform a comparison of information;
    comparing the information that identifies the self-executing cryptographic interaction protocol or the source device to a configuration, wherein the configuration identifies one or more self-executing cryptographic interaction protocols that the completion device is permitted to complete; and
    based on the comparing resulting in a match:
        outputting, via an output component of the completion device, a first indication of the match between the information and the configuration; and
        sending a signed self-executing cryptographic interaction protocol for an amount to the source device.

12. The completion device of claim 11, wherein the comparing of the information and the configuration further comprises:
    comparing an address of the source device to one or more addresses included in the configuration; and
    determining that the comparing results in the match based on comparing the address to the one or more addresses.

13. The completion device of claim 11, wherein the operations further comprise:
    receiving, prior to establishing a wireless connection, the configuration from a user device to which the completion device is connected.

14. The completion device of claim 11, wherein the first indication comprises at least one of:
    a light of the completion device,
    a color emitted from the light of the completion device, or
    a sound emitted from a speaker of the completion device.

15. The completion device of claim 11, wherein the operations further comprise:
    receiving, after outputting the first indication, input of a second indication to sign the self-executing cryptographic interaction protocol using a digital signature stored in a cryptographic hardware element of the completion device.

16. The completion device of claim 15, wherein the input comprises at least one of:
    a press of a button,
    a biometric scan,
    a voice command, or
    an alphanumeric code.

17. The completion device of claim 11, wherein the operations further comprise:
    receiving, from the source device, a second indication that the self-executing cryptographic interaction protocol has been completed; and
    outputting a third indication that the self-executing cryptographic interaction protocol has been completed.

18. The completion device of claim 11, wherein the completion device is connected to a user device associated with a same user as the completion device.

19. The completion device of claim 18, wherein the operations further comprise:
    sending a message to the user device to update a digital balance of the same user based on completion of the self-executing cryptographic interaction protocol.

20. A non-transitory computer-readable medium storing instructions that, when executed by a processor, cause the processor to perform a method for completing self-executing cryptographic interaction protocols using a completion device, the method comprising:
    establishing a wireless connection with a source device;
    receiving, from the source device, a request for completion of a self-executing cryptographic interaction protocol, wherein the request includes an amount associated with the self-executing cryptographic interaction protocol and information that identifies the self-executing cryptographic interaction protocol or the source device;
    receiving, by the completion device, an input by a user to perform a comparison of information;
    comparing the information that identifies the self-executing cryptographic interaction protocol to a configuration stored in the completion device, wherein the configuration identifies one or more self-executing cryptographic interaction protocols that the completion device is permitted to complete; and
    based on the comparing resulting in a match:
        outputting, via an output component of the completion device, a first indication of the match between the information and the configuration;
        receiving input of a second indication to sign the self-executing cryptographic interaction protocol using a digital signature stored in a cryptographic hardware element of the completion device;
        signing the self-executing cryptographic interaction protocol using the digital signature; and
        sending the signed self-executing cryptographic interaction protocol to the source device.

* * * * *